United States Patent [19]

Todereanu et al.

[11] 3,917,810
[45] Nov. 4, 1975

[54] PROCESS FOR PURIFYING ELECTROLYTIC HYDROGEN

[75] Inventors: Corneliu Todereanu; Iustin-Gheorghe Dimitriu; Ioan-Romulus Filip; Diona Ichim, all of Rimnicu Vilcea, Romania

[73] Assignee: Grupul Industrial de Chimie, Rimnicu Vilcea, Romania

[22] Filed: Jan. 30, 1975

[21] Appl. No.: 545,747

Related U.S. Application Data

[63] Continuation-in-part of Ser. No. 421,499, Dec. 3, 1973, abandoned, Continuation of Ser. No. 206,889, Feb. 10, 1971, abandoned.

[52] U.S. Cl. .................................. 423/648; 423/644
[51] Int. Cl.² .......................... C01B 1/26; C01B 1/28
[58] Field of Search ............ 423/648, 644, 179, 181

[56] References Cited
UNITED STATES PATENTS

| | | | |
|---|---|---|---|
| 2,747,970 | 5/1956 | Rosenblatt | 423/648 |
| 2,789,036 | 4/1957 | Tillman | 423/181 |
| 3,043,661 | 7/1962 | Childs | 423/181 |

FOREIGN PATENTS OR APPLICATIONS

| | | | |
|---|---|---|---|
| 955,724 | 4/1964 | United Kingdom | 423/648 |

OTHER PUBLICATIONS

"Ion Exchange Technology", by Nachod and Schubert, 1956 Ed., pp. 96, 240 and 250, Academic Press Inc., New York.
"Ion Exchange Separations in Analytical Chemistry", by O. Samuelson, 1963 Ed., pp. 150–156 and 179–181, John Wiley & Sons, N.Y.

*Primary Examiner*—Edward Stern
*Attorney, Agent, or Firm*—Karl F. Ross; Herbert Dubno

[57] ABSTRACT

A process for the removal of sodium hydroxide impurities from electrolytic hydrogen which comprises contacting the electrolytic hydrogen containing 1 to 20 mg of sodium hydroxide per m³ of hydrogen with a moistened layer of a cationic resin of the R-H type. The cationic resin may then be regenerated by contacting the resin with sulfuric acid.

4 Claims, No Drawings

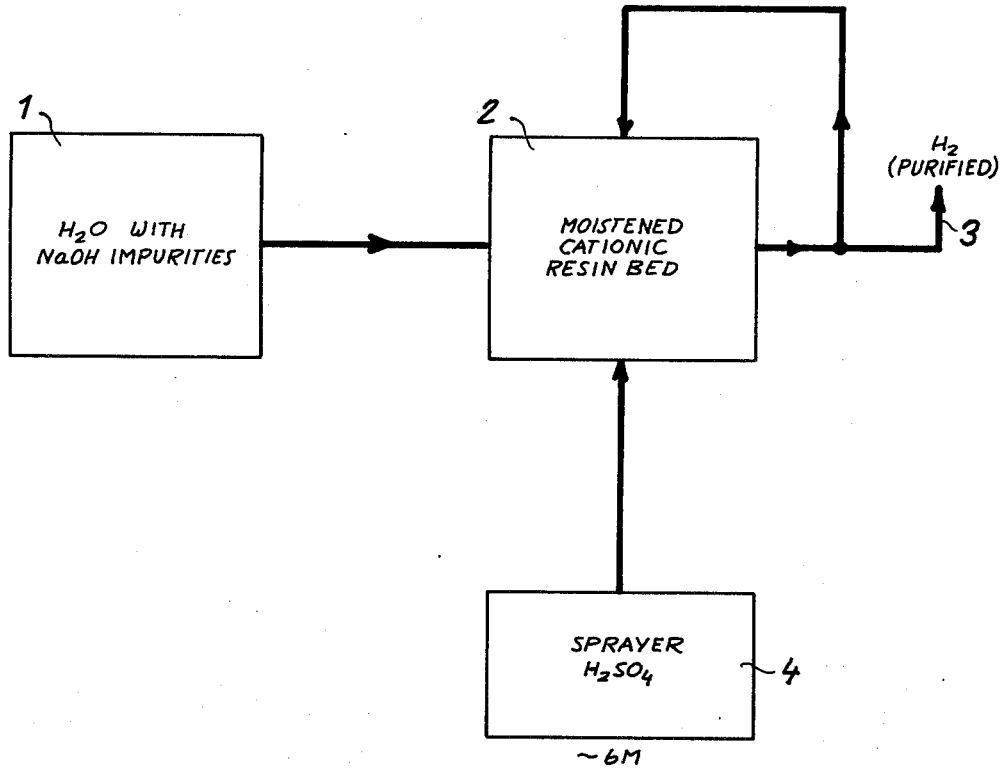

U.S. Patent  Nov. 4, 1975  3,917,810
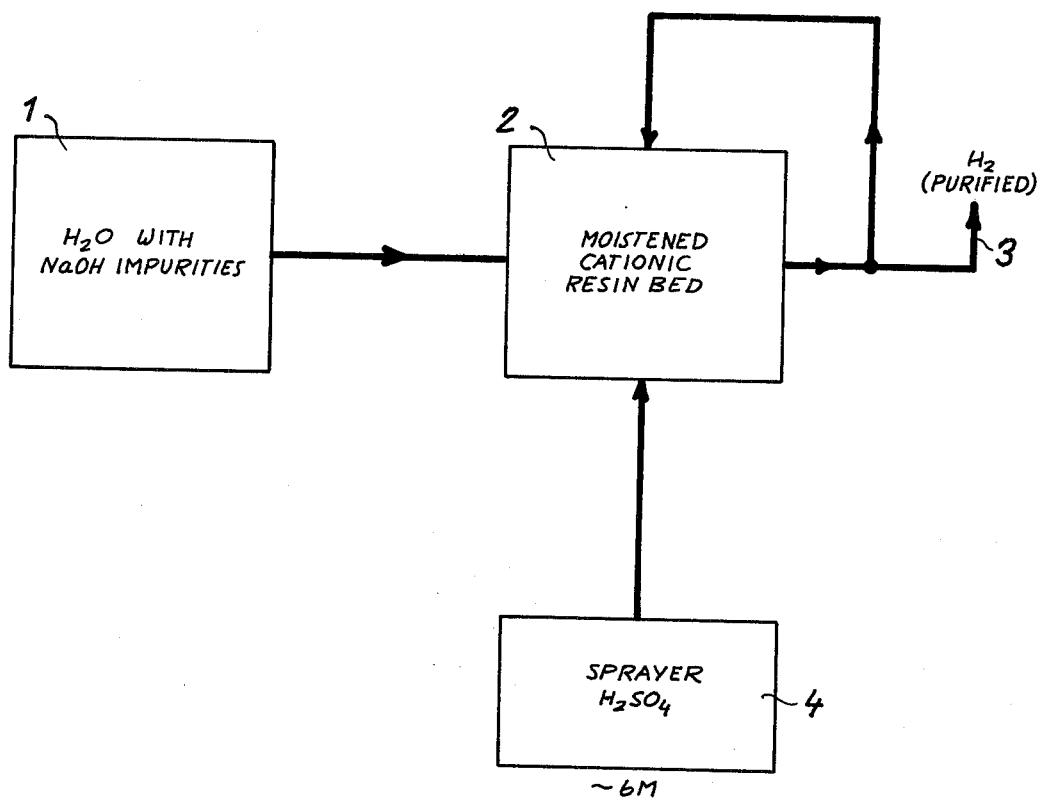

PROCESS FOR PURIFYING ELECTROLYTIC HYDROGEN

Cross-Reference to Related Applications

This application is a continuation-in-part application of Ser. No. 421,499, filed Dec. 3, 1973, now abandoned, which was filed as a continuation of Ser. 206,889, filed Dec. 10, 1971, now also abandoned.

Field of the Invention

The present invention relates to a process for the purification of electrolytic hydrogen and, more particularly, to a process for the removal of entrained droplets of sodium hydroxide from electrolytic hydrogen so as to permit the latter to be effectively used in catalytic hydrogenation of organic compounds.

Background of the Invention

Electrolytic hydrogen is produced in cells containing sodium hydroxide as an electrolyte and entrains, upon leaving the cell, a quantity of sodium hydroxide droplets depending upon the capacity at which the electrolysis plant operates. The entrained sodium hydroxide causes deterioration of compressors for the hydrogen and inactivation of the catalyst when the hydrogen is used for catalytic hydrogenation of organic compounds, e.g. in the production of oxo alcohols.

It is known to remove entrained sodium hydroxide from electrolytic hydrogen by washing the latter with water. This process has the disadvantage that the product may contain 0.1 mg sodium hydroxide per $m^3$ of hydrogen (STP), requires a large apparatus, has a high water consumption, and is a source of mercury-containing waste water.

Object of the Invention

It is the object of the present invention to provide a process for the purification of electrolytic hydrogen, i.e. for the removal of entrained droplets of sodium hydroxide from electrolytic hydrogen whereby the aforementioned disadvantages can be obviated.

Summary of the Invention

This object is attained, in accordance with the present invention, by contacting the electrolytic hydrogen containing 1 to 20 mg of sodium hydroxide per $m^3$ of hydrogen (STP) with a moistened layer of a cationic resin of the R-H type. Examples of specific cationic resins employed may be found in Table 16 - 3 -on page 16–6 of *Perry's Chemical Engineering'Handbook*, McGraw Hill (1963). These specific resins include sulfonated polystyrenes, sulfonated phenolic resins, resins from phenolmethylene sulfonic acid, cellulose alkyl sulfonic acid, and sulfonated coal. Preferably, the cationic resin is used in a volume of 0.75 $m^3$ 1000 $m^3$ of purified hydrogen (STP).

Brief Description of the Drawing

The above and other objects, features and advantages will become apparent from the following description, reference being made to the accompanying drawing in which the sole FIGURE is a flow-diagram illustrating the invention.

Specific Description

In the drawing, we show an electrolytic cell 1 used in the production of hydrogen. The hydrogen derived from the electrolytic cell contains some sodium hydroxide impurity. The hydrogen is then streamed over a moistened cationic resin bed 2 to remove ionic sodium. The hydrogen leaves the cationic resin bed at point 3 as purified hydrogen. The cationic resin may then be contacted with sulfuric acid ~ 6M from sprayer 4 to regenerate the resin. As evidenced by the table included hereinafter the purified hydrogen is virtually free of sodium hydroxide impurities.

TABLE

| Number of the Test | NaOH Content, in mg $NaOH/Nm^3H_2$ Before Purification | NaOH Content, in mg $NaOH/Nm^3H_2$ After Purification | Alkalinity of moistening water g/l NaOH |
|---|---|---|---|
| 1 | 4.8 | 0.01 | 0.0021 |
| 2 | 3.8 | traces | 0.004 |
| 3 | 3.4 | traces | 0.004 |
| 4 | 5.2 | traces | 0.008 |
| 5 | 4.2 | traces | 0.008 |
| 6 | 4.4 | traces | 0.004 |
| 7 | 3.4 | traces | 0.004 |
| 8 | 4.8 | traces | 0.004 |
| 9 | 4.6 | traces | 0.008 |
| 10 | 4.8 | traces | 0.008 |
| 11 | 4.8 | traces | 0.005 |

The cationic resin of the R-H type was used in a volume of 0.75 $m^3$/1000 $m^3$ of purified hydrogen (STP), water was recirculated at a rate of 0.4 $m^3$/h. Resin regeneration was effected after 200 hours with sulfuric acid (6M) and losses in the moistening water were replenished with demineralized water.

We claim:

1. A process for the production of hydrogen suitable for use in catalytic hydrogenation of organic compounds, comprising the steps of:
   a. deriving a stream of electrolytic hydrogen entraining 1 to 20 mg of sodium hydroxide per $m^3$ of hydrogen (STP) from an electrolytic hydrogen-production cell; and
   b. contacting the electrolytic hydrogen containing the sodium hydroxide impurity with a moistened layer of a cationic resin of the R-H type to remove sodium ion, said resin used in volume of about 0.75 $m^3$/1000 $m^3$ of purified hydrogen (STP).

2. The process of claim 1, step (b) where the cationic resin of the R-H type is selected from the group consisting of sulfonated polystyrenes, sulfonated phenolic resins, phenol methylene sulfonic acid resins, cellulose alkyl sulfonic acid resins, and sulfonated coal.

3. The process defined in claim 1 following step (b) wherein after 200 hours the cation exchange resin is regenerated with sulfuric acid.

4. The process defined in claim 1 wherein the losses in the moisture are replenished with demineralized water.

* * * * *